(12) United States Patent
Klimker et al.

(10) Patent No.: US 7,573,884 B2
(45) Date of Patent: Aug. 11, 2009

(54) CABLE MODEM DOWNSTREAM CHANNEL BONDING RE-SEQUENCING MECHANISM

(75) Inventors: Amos Klimker, Jerusalem (IL); Liran Brecher, Kfar Saba (IL); Etai Zaltsman, Ramat Hasharon (IL)

(73) Assignee: Texas Instruments Incorporated, Dallas, TX (US)

( * ) Notice: Subject to any disclaimer, the term of this patent is extended or adjusted under 35 U.S.C. 154(b) by 275 days.

(21) Appl. No.: 11/681,784

(22) Filed: Mar. 4, 2007

(65) Prior Publication Data

US 2007/0206600 A1  Sep. 6, 2007

Related U.S. Application Data

(60) Provisional application No. 60/780,011, filed on Mar. 6, 2006.

(51) Int. Cl.
*H04L 12/54* (2006.01)
*H04L 12/56* (2006.01)
(52) U.S. Cl. ...................... 370/394; 370/428
(58) Field of Classification Search ................. 370/394, 370/390
See application file for complete search history.

(56) References Cited

U.S. PATENT DOCUMENTS 6,934,760 B1 * 8/2005 Westbrook et al. .......... 709/236
2003/0214949 A1 * 11/2003 Shaikli ....................... 370/394
2004/0143593 A1 * 7/2004 Le Maut et al. ............. 707/102
2004/0181811 A1   9/2004 Rakib
2005/0265394 A1 * 12/2005 Chapman et al. ............ 370/480

OTHER PUBLICATIONS

DOCSIS 3.0-MAC and Upper Layer Protocol Interface Specification, Document CM-SP-MULPIv3.0-Pre101-060804, Aug. 4, 2006, pp. 65-85.

* cited by examiner

*Primary Examiner*—Lewis G. West
*Assistant Examiner*—Jung Liu
(74) *Attorney, Agent, or Firm*—Steven A. Shaw; W. James Brady; Frederick J. Telecky, Jr.

(57) ABSTRACT

A novel apparatus and method of packet re-sequencing applicable to systems wherein packets are assigned sequence numbers and transmitted over multiple channels with the requirement they be re-ordered at the receiving side. The mechanism is particularly suitable for use in cable systems adapted to implement the DOCSIS 3.0 specification which permits the bonding of a plurality of downstream channels into a single virtual high data rate pipe. In operation, received packets are stored in a memory whereby a pointer to the memory storage location is written into a context table diagram in accordance with the sequence number extracted from the packet. Packets are released in sequence order regardless of the order in which they were received.

25 Claims, 8 Drawing Sheets

LAST SEQUENCE TABLE
130

| | |
|---|---|
| DC1 | 30 |
| DC2 | 40 |
| DC3 | 25 |
| DC4 | 50 |

132 (pointing to DC1 row and DC2 row)

FIG. 6

MAXIMUM SEQUENCE SNAPSHOT TABLE
140

| ELAPSED TIME | 0 | 2 | 4 | 6 | 8 | 10 | 12 | 14 | 16 | 18 |
|---|---|---|---|---|---|---|---|---|---|---|
| MAXIMUM SEQUENCE | 25 | | | | | | | | | |

CABLE MODEM DOWNSTREAM CHANNEL BONDING RE-SEQUENCING MECHANISM

REFERENCE TO PRIORITY APPLICATION

This application claims priority to U.S. Provisional Application Ser. No. 60/780,011, filed Mar. 6, 2006, entitled "DOCSIS-3.0 Downstream Channel Bonding CM Re-Sequencing Algorithm", incorporated herein by reference in its entirety.

FIELD OF THE INVENTION

The present invention relates to the field of data communications and more particularly relates to an apparatus for and method of downstream channel bonding cable modem re-sequencing mechanism.

BACKGROUND OF THE INVENTION

Currently there are more than 50 million high-speed Internet access customers in North America. Recently, the cable modem has become the broadband connection of choice for many Internet users, being preferred over the nearest rival broadband technology, Digital Subscriber Line (DSL), by a significant margin.

Cable modems are well known in the art. A cable modem is a type of modem that provides access to a data signal sent over the cable television (CATV) infrastructure. Cable modems are primarily used to deliver broadband Internet access, taking advantage of unused bandwidth on a cable television network. In 2005 there were over 22.5 million cable modem users in the United States alone.

A cable modem is a network appliance that enables high speed data connections to the internet via data services provided by the local cable company. Data from the home is sent upstream on a carrier that operates on the 5 MHz to 42 MHz band of the cable spectrum. Downstream data is carried on a 88 MHz to 860 MHz band. The cable modem system can have additional networking features such as Voice over IP (VoIP), wireless connectivity or network switch or hub functionality.

The term cable Internet access refers to the delivery of Internet service over the cable television infrastructure. The proliferation of cable modems, along with DSL technology, has enabled broadband Internet access in many countries. The bandwidth of cable modem service typically ranges from 3 Mbps up to 40 Mbps or more. The upstream bandwidth on residential cable modem service usually ranges from 384 kbps to 30 Mbps or more. In comparison, DSL tends to offer less speed and more variance between service packages and prices. Service quality is also far more dependent on the client's location in relation to the telephone company's nearest central office or Remote Terminal.

Users in a neighborhood share the available bandwidth provided by a single coaxial cable line. Therefore, connection speed varies depending on how many people are using the service at the same time. In most areas this has been eliminated due to redundancy and fiber networks.

With the advent of Voice over IP telephony, cable modems are also be used to provide telephone service. Many people who have cable modems have opted to eliminate their Plain Old Telephone Service (POTS). An alternative to cable modems is the Embedded Multimedia Terminal Adapter (EMTA). An EMTA allows multiple service operators (MSOs) to offer both High Speed Internet and VoIP through a single piece of customer premise equipment. A multiple system operator is an operator of multiple cable television systems.

Many cable companies have launched Voice over Internet Protocol (VoIP) phone service, or digital phone service, providing consumers a true alternative to standard telephone service. Digital phone service takes the analog audio signals and converts them to digital data that can be transmitted over the fiber optic network of the cable company. Cable digital phone service is currently available to the majority of U.S. homes with a large number of homes are now subscribing. The number of homes subscribing is currently growing by hundreds of thousands each quarter. One significant benefit of digital phone service is the substantial consumer savings, with one recent study saying residential cable telephone consumers could save an average of $135 or more each year.

The Data Over Cable Service Interface Specification (DOCSIS) compliant cable modems have been fueling the transition of cable television operators from a traditional core business of entertainment programming to a position as full-service providers of video, voice, and data telecommunications services.

The latest DOCSIS specification, DOCSIS 3.0, include a number of enhancements, most notably, channel bonding and support for IPv6. Channel bonding provides cable operators with a flexible way to increase upstream and downstream throughput to customers, with data rates in the hundreds of megabits and potentially gigabits per second. DOCSIS 3.0 increases the capacity of cable modems to a minimum of 160 Mbps downstream to customers and to a minimum of 120 Mbps upstream.

Cable systems transmit digital data signals over radio frequency (RF) carrier signals. To provide two-way communication, one carrier signal carries data in the downstream direction from the cable network to the customer and another carrier signal carries data in the upstream direction from the customer to the cable network. Cable modems are devices located at the subscriber premises that functions to convert digital information into a modulated RF signal in the upstream direction, and to convert the RF signals to digital information in the downstream direction. A cable modem termination system (CMTS) performs the opposite operation for multiple subscribers at the cable operator's head-end.

Typically, several hundreds of users share a 6 MHz downstream channel and one or more upstream channels. The downstream channel occupies the space of a single television transmission channel in the cable operator's channel lineup. It is compatible with digital set top MPEG transport stream modulation (64 or 256 QAM), and provides up to 40 Mbps. A media access control (MAC) layer coordinates shared access to the upstream bandwidth.

In order to provide faster data rates to customers, DOCSIS 3.0 introduces the concept of bonding several physical downstream channels into one virtual high speed pipe. Channel bonding is a load-sharing technique for logically combining multiple DOCSIS channels. DOCSIS 3.0 defines channel bonding for both the upstream and downstream directions. For downstream channel bonding, each downstream DOCSIS channel carries a payload of approximately 38 Mbps (50 Mbps with EuroDOCSIS). Load sharing traffic across multiple channels allows a maximum throughput of up to n×38 Mbps (or n×50 Mbps), with n representing the number of channels being bonded. A separate 6 MHz or 8 MHz frequency is used for each of the bonded channels. Upstream channel bonding is possible for a minimum of four channels, 10 to 30 Mbps each, for a total of 40 to 120 Mbps of shared throughput.

Due to certain properties of the media, however, different physical channels may have different delays. Thus, packets that arrive to the CMTS Network Side Interface (NSI) port in a certain order from the transmitter side may arrive at the cable modem (CM) PHY-MAC interface out of order. The maximum skew defined in the DOCSIS 3.0 specification is 18 milliseconds which means that two consecutive packets arriving at the CMTS may be up to 18 milliseconds apart when they arrive at the cable modem. The MAC layer in the cable modem is responsible for reordering the packets and forwarding them to higher layers in the correct order.

It is thus desirable to have a mechanism that provides an efficient method of re-sequencing (or re-ordering) the packets received from the CMTS. In addition, the mechanism should have a minimal impact on the operation of existing cable modems in terms of processing resource requirements and any added processing delays.

SUMMARY OF THE INVENTION

The present invention is a novel apparatus and method of packet re-sequencing. The packet re-sequencing mechanism is applicable to systems wherein packets are assigned sequence numbers and transmitted over multiple channels and need to be re-ordered at the receiving side. The mechanism is particularly suitable for use in cable systems adapted to implement the DOCSIS 3.0 specification which permits the bonding of a plurality of downstream channels into a single virtual high data rate pipe.

In operation, received packets are stored in a memory whereby a pointer to the memory storage location is written into a context table diagram in accordance with the sequence number extracted from the packet. The particular downstream channel the packet was received over is tracked and the last sequence numbers received over each channel is stored in a table. In addition, in order to address the problem of potential timing skew between channels, a snapshot is periodically taken of the maximum last sequence number of all channels and stored in a max sequence snapshot table. A history of maximum last sequence numbers is maintained for the maximum skew anticipated.

When releasing packets, the mechanism is operative to retrieve packets from the memory in accordance with the pointers stored in the context table. The packets are retrieved in sequence order up to the larger of the current minimum last sequence number and the oldest maximum last sequence number stored in the max sequence snapshot table. Packets continue to be released until a missing packet is encountered.

To aid in understanding the principles of the present invention, the description is provided in the context of a DOCSIS 3.0 capable cable system comprising a cable modem adapted to receive an RF feed from a cable head-end (i.e. CMTS) and to distribute video, Internet and telephony to a subscriber premises. It is appreciated, however, that the invention is not limited to use with any particular communication device or standard and may be used in optical, wired and wireless applications. Further, the invention is not limited to use with a specific technology but is applicable to any situation where it is desired to re-order (re-sequence) packets received over a plurality of downstream channel in an efficient manner while having a minor impact in terms of added cost and processing requirements.

Note that many aspects of the invention described herein may be constructed as software objects that are executed in embedded devices as firmware, software objects that are executed as part of a software application on either an embedded or non-embedded computer system running a real-time operating system such as WinCE, Symbian, OSE, Embedded LINUX, etc. or non-real time operating system such as Windows, UNIX, LINUX, etc., or as soft core realized HDL circuits embodied in an Application Specific Integrated Circuit (ASIC) or Field Programmable Gate Array (FPGA), or as functionally equivalent discrete hardware components.

There is thus provided in accordance with the present invention, a method of re-sequencing packets received over a plurality of downstream channels, each received packet having a sequence number associated therewith, the method comprising the steps of updating a last sequence table in accordance with the sequence number associated with a received packet, the last sequence table comprising one entry for each downstream channel, storing the received packet in a location in memory, storing a pointer to the memory location in a context table at an entry sequence location corresponding to the sequence number of the received packet, periodically storing a snapshot of the maximum entry in the last sequence table in a max sequence snapshot table and releasing packets from the memory in sequence number order in accordance with pointers read from the context table up to the larger of the smallest entry in the last sequence table and the oldest entry in the max sequence snapshot table.

There is also provided in accordance with the present invention, a method of re-sequencing packets received over a plurality of downstream channels, each received packet having a sequence number associated therewith, the method comprising the steps of storing received packets in a memory, tracking a last sequence number received over each downstream channel, periodically recording a snapshot of the maximum last sequence number received over all downstream channels and releasing packets from the memory in sequence order up to the larger of the current minimum last sequence number received and the oldest maximum last sequence number received.

There is further provided in accordance with the present invention, an apparatus for re-sequencing packets received over a plurality of downstream channels, each received packet having a sequence number associated therewith comprising a memory, a context table operative to store pointers to received packets, a last sequence table operative to store a plurality of sequence numbers, one for each the downstream channel, a max snapshot table operative to store a history of maximum last sequence numbers, means for updating the last sequence table in accordance with the sequence number of a received packet, means for storing the received packet in a location in the memory, means for storing a pointer to the memory location in the context table at an entry sequence location corresponding to the sequence number of the received packet, means for periodically updating the max sequence snapshot table with a maximum entry in the last sequence table and means for releasing packets from the memory in sequence number order in accordance with pointers read from the context table, wherein packets are released up to the larger of the smallest entry in the last sequence table and the oldest entry in the max sequence snapshot table.

There is also provided in accordance with the present invention, a cable modem comprising a memory, one or more interface ports, a tuner coupled to a CATV cable having a plurality of channels, the tuner operative to tune a received broadband signal in accordance with a tune command, a PHY circuit coupled to the tuner and operative to generate a baseband signal from the output of the tuner, a processor coupled to the memory, the one or more interface ports, the tuner and the PHY circuit, the processor operative to implement a media access control (MAC) layer operative to re-sequence packets received over a plurality of downstream channels, each received packet having a sequence number associated therewith, the MAC layer comprising means for storing received packets in the memory, means for tracking a last sequence number received over each downstream channel, means for periodically recording the maximum last sequence number received over all downstream channels and means for releasing packets from the memory in sequence order up to the larger of the current minimum last sequence number received and the oldest maximum last sequence number received.

BRIEF DESCRIPTION OF THE DRAWINGS

The invention is herein described, by way of example only, with reference to the accompanying drawings, wherein.

DETAILED DESCRIPTION OF THE INVENTION

Notation Used Throughout

The following notation is used throughout this document.

| Term | Definition |
| --- | --- |
| AC | Alternating Current |
| ASIC | Application Specific Integrated Circuit |
| ATM | Asynchronous Transfer Mode |
| CATV | Community Antenna Television or Cable TV |
| CM | Cable Modem |
| CMTS | Cable Modem Termination System |
| CO | Central Office |
| CPU | Central Processing Unit |
| DC | Direct Current |
| DHCP | Dynamic Host Control Protocol |
| DOCSIS | Data Over Cable Service Interface Specification |
| DS-EHDR | Downstream Service Extended Header |
| DSID | Downstream Service ID |
| DSL | Digital Subscriber Line |
| DSP | Digital Signal Processor |
| EEROM | Electrically Erasable Read Only Memory |
| EHDR | Extended Header |
| EMTA | Embedded Multimedia Terminal Adapter |
| FC | Frame Control |
| FPGA | Field Programmable Gate Array |
| GPIO | General Purpose I/O |
| HCS | Header Check Sequence |
| HDL | Hardware Description Language |
| IC | Integrated Circuit |
| IP | Internet Protocol |
| LAN | Local Area Network |
| LED | Light Emitting Diode |
| LSB | Least Significant Bit |

-continued

| Term | Definition |
| --- | --- |
| MAC | Media Access Control |
| MPEG | Moving Picture Experts Group |
| MSO | Multiple Service Operator |
| NSI | Network Side Interface |
| PC | Personal Computer |
| POTS | Plain Old Telephone Service |
| QAM | Quadrature Amplitude Modulation |
| QoS | Quality of Service |
| RAM | Random Access Memory |
| RF | Radio Frequency |
| ROM | Read Only Memory |
| SLA | Service Level Agreement |
| SLIC | Subscriber Line Interface Card |
| SONET | Synchronous Optical Network |
| TLV | Type, Length, Value |
| TV | Television |
| USB | Universal Serial Bus |
| VoIP | Voice over IP |
| WLAN | Wireless Local Area Network |

Detailed Description of the Invention

The present invention is a novel apparatus and method of packet re-sequencing. The packet re-sequencing mechanism is applicable to systems wherein packets are assigned sequence numbers and transmitted over multiple channels and need to be re-ordered at the receiving side. The mechanism is particularly suitable for use in cable systems adapted to implement the DOCSIS 3.0 specification which permits the bonding of a plurality of downstream channels into a single virtual high data rate pipe.

To aid in understanding the principles of the present invention, the description is provided in the context of a DOCSIS 3.0 capable cable system comprising a cable modem adapted to receive an RF feed from a cable head-end (i.e. CMTS) and to distribute video, Internet and telephony to a subscriber premises. It is appreciated, however, that the invention is not limited to use with any particular communication device or standard and may be used in optical, wired and wireless applications. Further, the invention is not limited to use with a specific technology but is applicable to any situation where it is desired to re-order (re-sequence) packets received over a plurality of downstream channel in an efficient manner while having a minor impact in terms of added cost and processing requirements.

Note that throughout this document, the term communications device is defined as any apparatus or mechanism adapted to transmit, or transmit and receive data through a medium. The communications device may be adapted to communicate over any suitable medium such as RF, wireless, infrared, optical, wired, microwave, etc. In the case of wireless communications, the communications device may comprise an RF transmitter, RF receiver, RF transceiver or any combination thereof.

The term cable modem is defined as a modem that provides access to a data signal sent over the cable television infrastructure. The term voice cable modem is defined as a cable modem that incorporates VoIP capabilities to provide telephone services to subscribers. Channel bonding is defined as a load-sharing technique for logically combining multiple DOCSIS channels into a single virtual pipe. It is described in detail in the DOCSIS 3.0 specification, incorporated herein by reference in its entirety.

Cable System Incorporating Packet Re-Sequencing Mechanism

Figure 1:
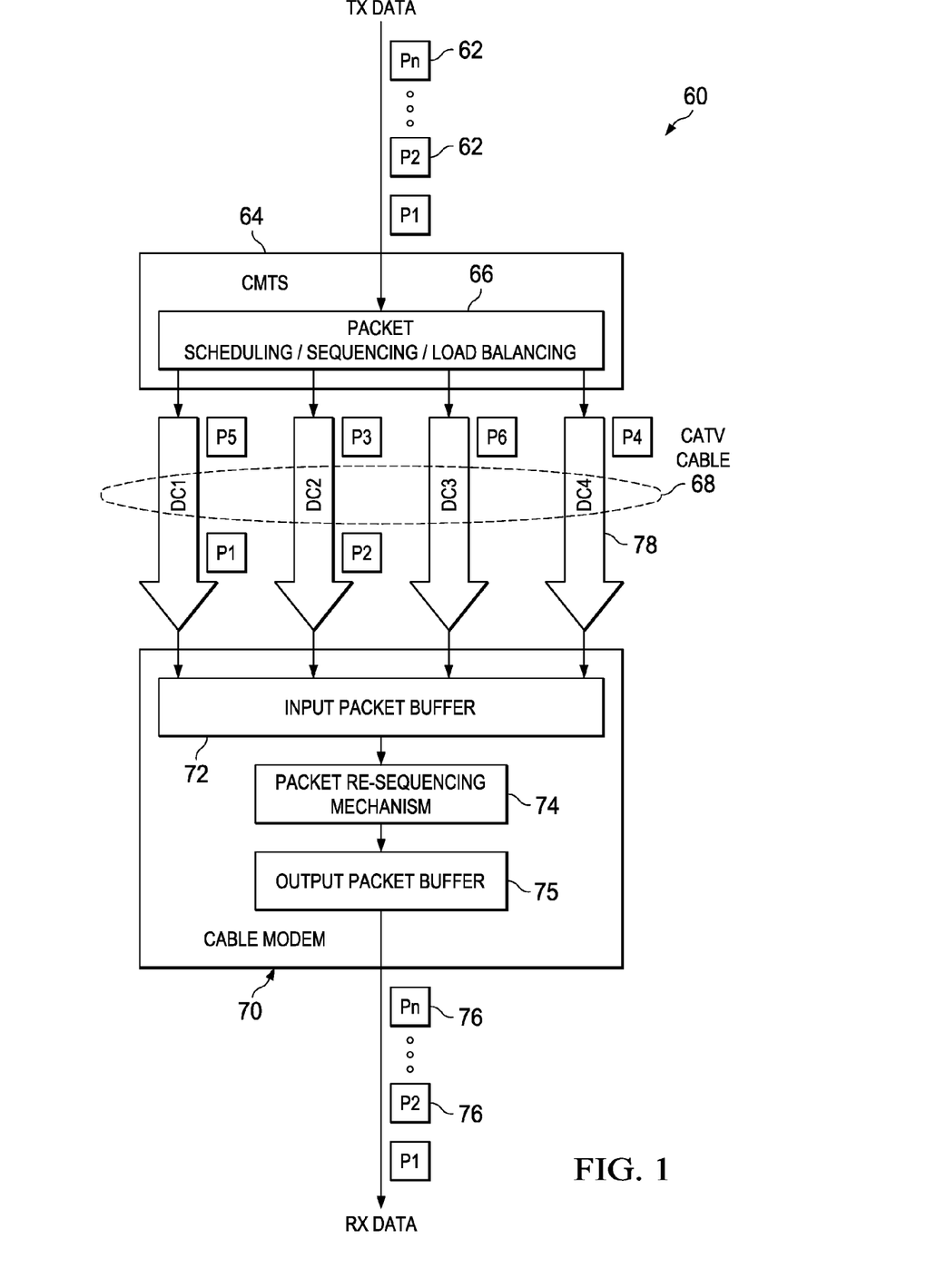
FIG. 1 is a block diagram illustrating the packet flow over multiple downstream channels between CMTS and cable modem.

A block diagram illustrating the packet flow over multiple downstream channels between CMTS and cable modem is shown in FIG. 1. The system, generally referenced 60, comprises a cable modem termination system (CMTS) 64 in communication with one or more cable modems (CMs) 70 via a plurality of downstream channels (DCs) 78. In this example, there are four DCs (i.e. DC1, DC2, DC3 and DC4) established between the CMTS and the cable modem. All downstream channels are carried over the CATV cable. Multiple downstream channels are provided for the DOCSIS 3.0 specification. The CMTS comprises a packet scheduling/sequencing/load balancing module 66. The cable modem comprises an input packet buffer 72, packet re-sequencing mechanism 74 and output packet buffer 75.

DOCSIS 3.0 cable standard introduces the concept of channel bonding, whereby several physical downstream channels can be bonded or associated together into a single virtual pipe that provides significantly faster data rates.

The CMTS is administered by the multiple service operator (MSO). The CMTS delivers the various content feeds such as satellite, local antenna and terrestrial feeds which are input to a combiner (not shown) in the cable head-end. The cable head-end comprises the voice over IP (VoIP) gateway and Cable Modem Termination System (CMTS). The combiner merges the TV programming feeds with the RF data from the CMTS.

The Cable Modem Termination System 64 is a computerized device that enables cable modems to send and receive packets over the Internet. The IP packets are typically sent over Layer 2 and may comprise, for example, Ethernet or SONET frames or ATM cells. The CMTS inserts IP packets from the Internet into MPEG frames and transmits them to the cable modems located in subscriber premises via an RF signal. It does the reverse process coming from the cable modems. A DOCSIS-compliant CMTS enables customer PCs to dynamically obtain IP addresses by acting as a proxy and forwarding DHCP requests to DHCP servers. A CMTS may provide filtering to protect against theft of service and denial of service attacks or against hackers trying to break into the cable operator's system. It may also provide traffic shaping to guarantee a specified quality of service (QoS) to selected customers. A CMTS may also provide bridging or routing capabilities.

In operation, transmit data packets 62 to be sent over the cable the cable modem are processed by the CMTS before being transmitted over the downstream channels. A sequence number is assigned to each packet and inserted into the DOCSIS header. In addition, the packet is scheduled and transmitted over one of the downstream channels in accordance with any number of factors such as service level agreement (SLA), current load, etc. In order to maximize the available bandwidth to users, the CMTS performs load balancing whereby it is attempted to maintain the same level of utilization of each of the downstream channels at all times.

Packets arriving over the downstream channels are input to an input packet buffer 72 and combined into a single packet stream. Note that due to different PHY parameters (i.e. modulation scheme, interleaver parameters, etc.) in each of the downstream channels, packets arriving at the cable modem may be skewed significantly. The DOCSIS 3.0 standard permits a maximum of 18 milliseconds of skew between downstream channels. As shown in FIG. 1, packets P1 through Pn are sequenced and sent to the cable modem over the downstream channels 78. Specifically, packets P1 and P5 are sent over DC1, packets P2 and P3 are sent over DC2, packet P6 is sent over DC3 and packet P4 is sent over DC4. Each packet arrives at the cable modem independently of the over packet. One constraint, however, is that within each downstream channel, sequence numbers can only increase over time. Thus, a packet with a smaller sequence number will never be sent later in time than a packet with a larger sequence number.

In accordance with the packet re-sequencing mechanism of the present invention, the received packet stream is re-sequenced (i.e. re-ordered) in an quick and efficient manner. Re-ordering is required since packets may be received out of sequence due to the potential time skew arising between the different downstream channels. The re-ordered packets are placed in an output packet buffer 75 and eventually output as Rx data 76 via an appropriate port (e.g., Ethernet, USB, video, voice, etc.) to a device connected to the cable modem.

Voice Cable Modem Incorporating Packet Re-Sequencing Mechanism

Figure 2:
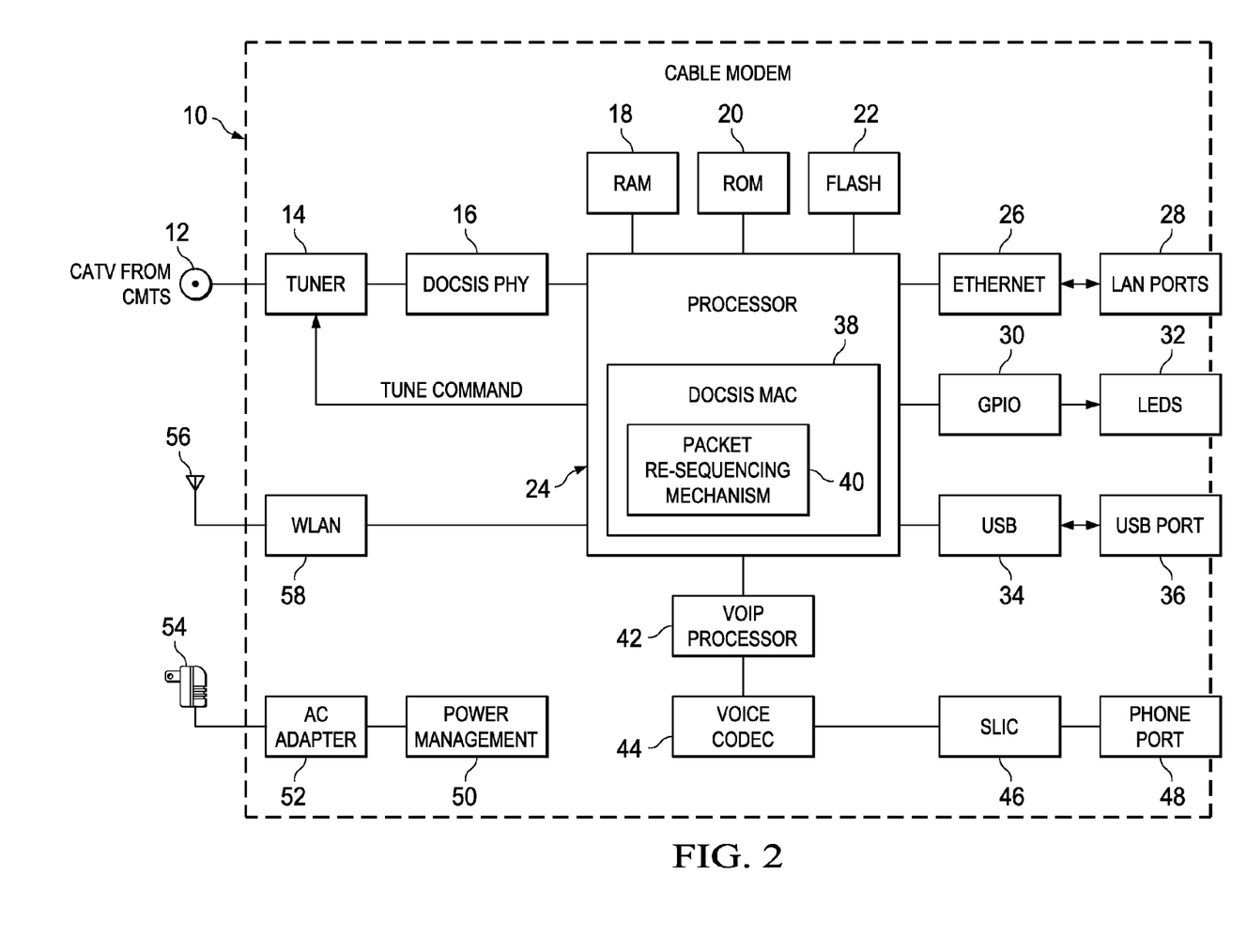
FIG. 2 is a block diagram illustrating an example cable modem system incorporating the re-sequencing mechanism of the present invention.

A block diagram illustrating an example cable modem incorporating the packet re-sequencing mechanism of the present invention is shown in FIG. 2. The cable modem, generally referenced 10, comprises a tuner 14, DOCSIS PHY circuit 16, DOCSIS compatible processor 24 operative to implement the packet re-sequencing mechanism 40 of the present invention within the DOCSIS MAC 38, VoIP processor 42, voice codec 44, subscriber line interface card (SLIC) 46, phone port 48, antenna 56, wireless local area network (WLAN) 58, Ethernet interface 26, Ethernet LAN port 28, general purpose (I/O) (GPIO) interface 30, LEDs 32, universal serial bus (USB) interface 34, USB port 36, AC adapter 52, power management circuit 50, ROM 20, RAM 18 and FLASH memory 22. Note that in the example embodiment presented herein, the cable modem and DOCSIS enabled processor 24 are adapted to implement the DOCSIS 3.0 standard which provides for channel bonding wherein a plurality of downstream channels are used to transmit data from the CMTS to the cable modem. A plurality of contexts may be established whereby packets are sent over multiple downstream channels and recombined at the cable modem to yield several separate contexts.

In operation, the cable modem processor 24 is the core chip set which in the example presented herein comprises a central single integrated circuit (IC) with peripheral functions added. The voice over IP (VoIP) processor 42 implements a mechanism to provide phone service outside the standard telco channel. Chipset DSPs and codecs 44 add the functionality of POTS service for low rate voice data.

The cable modem also comprises a subscriber line interface card (SLIC) 46 which functions to provide the signals and functions of a conventional local loop to a plurality of telephone devices connected via the phone port 48 using internal 2-wire telephone wiring. In particular, it generates call progress tones including dial tone, ring tone, busy signals, etc. that are normally provided by the local loop from the CO. Since the telephone deices are not connected to the CO, the SLIC in the cable modem must provide these signals in order that the telephone devices operate correctly.

In a traditional analog telephone system, each telephone or other communication device (i.e. subscriber unit) is typically interconnected by a pair of wires (commonly referred to as tip and ring or together as subscriber lines, subscriber loop or phone lines) through equipment to a switch at a local telephone company office (central office or CO). At the CO, the tip and ring lines are interconnected to a SLIC which provides required functionality to the subscriber unit. The switches at the central offices are interconnected to provide a network of switches thereby providing communications between a local subscriber and a remote subscriber.

The SLIC is an essential part of the network interface provided to individual analog subscriber units. The functions provided by the SLIC include providing talk battery (between 5 VDC for on-hook and 48 VDC for off-hook), ring voltage (between 70-90 VAC at a frequency of 17-20 Hz), ring trip, off-hook detection, and call progress signals such as ringback, busy, and dial tone.

A SLIC passes call progress tones such as dial tone, busy tone, and ringback tone to the subscriber unit. For the convenience of the subscriber who is initiating the call, these tones normally provided by the central office give an indication of call status. When the calling subscriber lifts the handset or when the subscriber unit otherwise generates an off hook condition, the central office generates a dial tone and supplies it to the calling subscriber unit to indicate the availability of phone service. After the calling subscriber has dialed a phone number of the remote (i.e. answering) subscriber unit, the SLIC passes a ring back sound directed to the calling subscriber to indicate that the network is taking action to signal the remote subscriber, i.e. that the remote subscriber is being rung. Alternatively, if the network determines that the remote subscriber unit is engaged in another call (or is already off-hook), the network generates a busy tone directed to the calling subscriber unit.

The SLIC also acts to identify the status to, or interpret signals generated by, the analog subscriber unit. For example, the SLIC provides –48 volts on the ring line, and 0 volts on the tip line, to the subscriber unit. The analog subscriber unit provides an open circuit when in the on-hook state. In a loop start circuit, the analog subscriber unit goes off-hook by closing, or looping the tip and ring to form a complete electrical circuit. This off-hook condition is detected by the SLIC (whereupon a dial tone is provided to the subscriber). Most residential circuits are configured as loop start circuits.

Connectivity is provided by a standard 10/100/1000 Mbps Ethernet interface 26 and Ethernet LAN port 28, USB interface 34 and USB port 36 or with additional chip sets, such as wireless 802.11a/b/g via WLAN interface 58 coupled to antenna 56. In addition, a GPIO interface 30 provides an interface for LEDs 32, etc. The network connectivity functions may also include a router or Ethernet switch core. Note that the Ethernet MAC 38 and PHY 16 are typically integrated into the cable modem processor 24 or may be separate as shown in FIG. 1 wherein the DOCSIS PHY circuit 16 is shown separate from the processor 24.

In the example embodiment presented herein, the tuner 14 is coupled to the CATV signal from the CMTS via port 12 and is operative to convert the RF signal received over the RF cable to an IF frequency in accordance with a tune command received from the processor.

The cable modem 10 comprises a processor 24 which may comprise a digital signal processor (DSP), central processing unit (CPU), microcontroller, microprocessor, microcomputer, ASIC, FPGA core or any other suitable processing means. The cable modem also comprises static read only memory (ROM) 20, dynamic main memory 18 and FLASH memory 22 all in communication with the processor via a bus (not shown).

The magnetic or semiconductor based storage device 18 (i.e. RAM) is used for storing application programs and data.

The cable modem comprises computer readable storage medium that may include any suitable memory means, including but not limited to, magnetic storage, optical storage, semiconductor volatile or non-volatile memory, biological memory devices, or any other memory storage device.

Software adapted to implement the packet re-sequencing mechanism of the present invention is adapted to reside on a computer readable medium, such as a magnetic disk within a disk drive unit. Alternatively, the computer readable medium may comprise a floppy disk, removable hard disk, Flash memory 22, EEROM based memory, bubble memory storage, ROM storage 20, distribution media, intermediate storage media, execution memory of a computer, and any other medium or device capable of storing for later reading by a computer a computer program implementing the system and methods of this invention. The software adapted to implement the packet re-sequencing mechanism of the present invention may also reside, in whole or in part, in the static or dynamic main memories 18 or in firmware within the processor of the computer system (i.e. within microcontroller, microprocessor or microcomputer internal memory).

Figure 3:
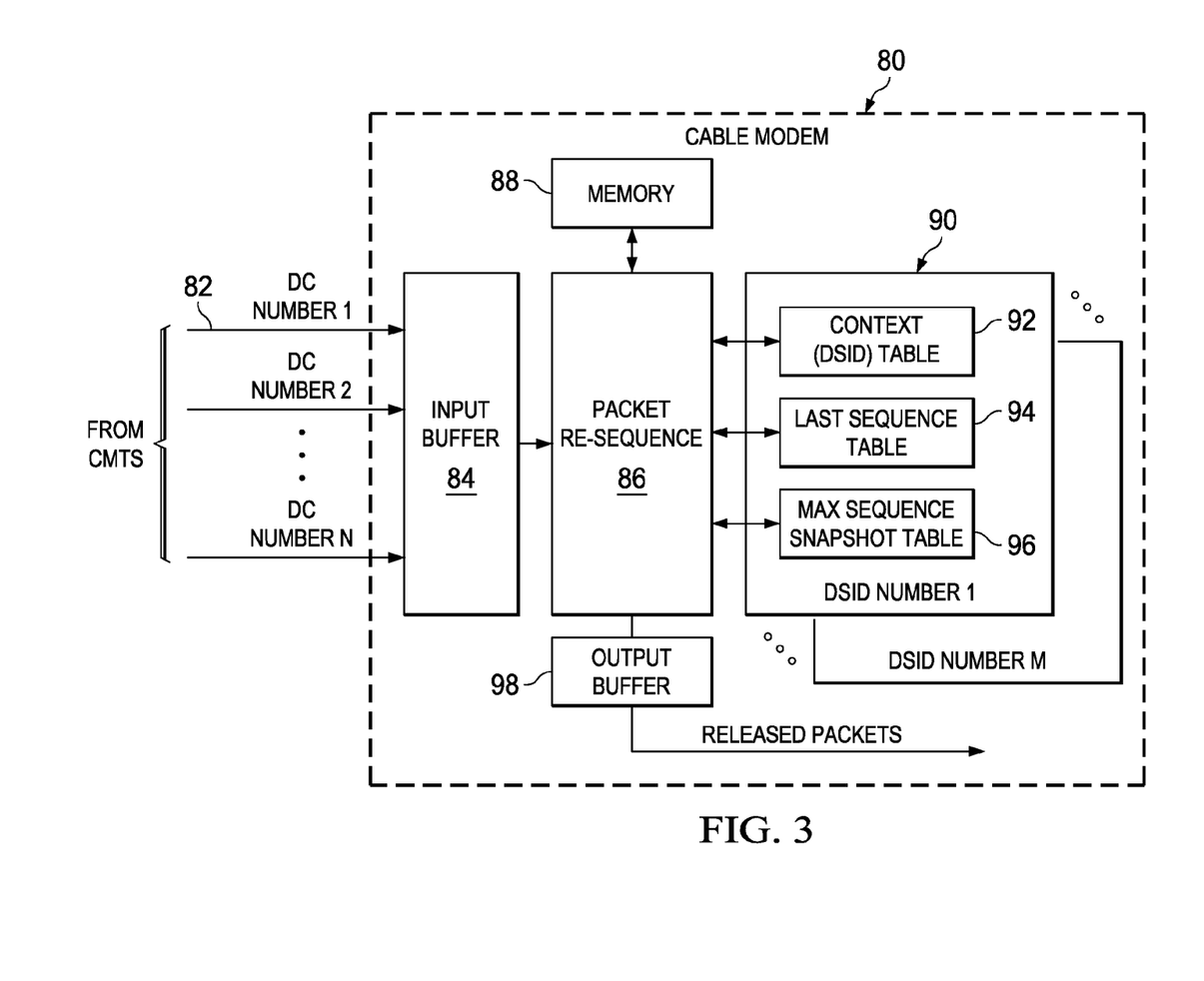
FIG. 3 is a block diagram illustrating an example embodiment of the cable modem re-sequencing mechanism of the present invention.

A block diagram illustrating an example embodiment of the cable modem re-sequencing mechanism of the present invention is shown in FIG. 3. The example cable modem, generally referenced 80, comprises an input packet buffer 84, packet re-sequencer 86, external (or internal) memory 88, output packet buffer 98 and a plurality of M groups of tables 90. Each table which may comprise an internal data structure) comprises a context (DSID) table 92, last sequence table 94 and max sequence snapshot table 96.

In operation, received packets are stored in a memory whereby a pointer to the memory storage location is written into a context table diagram in accordance with the sequence number extracted from the packet. The particular downstream channel the packet was received over is tracked and the last sequence numbers received over each channel is stored in a table. In addition, in order to address the problem of potential timing skew between channels, a snapshot is periodically taken of the maximum last sequence number of all channels and stored in a max sequence snapshot table. A history of maximum last sequence numbers is maintained for the maximum skew anticipated.

When releasing packets, the mechanism is operative to retrieve packets from the memory in accordance with the pointers stored in the context table. The packets are retrieved in sequence order up to the larger of the current minimum last sequence number and the oldest maximum last sequence number stored in the max sequence snapshot table. Packets continue to be released until a missing packet is encountered.

Packets transmitted from the CMTS are received over the N downstream channels 82 (i.e. DC#1 to DC#N) by the input packet buffer 84. Data from all N downstream channels is pooled and combined into a single stream. This stream is input to the packet re-sequencer 86.

Note that the invention is not limited by the number of downstream channels. More than likely, the number of downstream channels is limited by the available bandwidth. The DOCSIS 3.0 specification provides that each channel has its own set of parameters, such as modulation (e.g., 16 QAM, 64 QAM, etc.), interleaving, coding, etc. Further, the specification provides for a maximum skew of 18 milliseconds between all channels. The example embodiments described herein are adapted to accommodate this skew. It is appreciated, however, that the invention is not limited to this skew as one skilled in the art can easily apply the principles of the present invention to larger or smaller skews without departing from the scope of the invention.

Figure 9A:
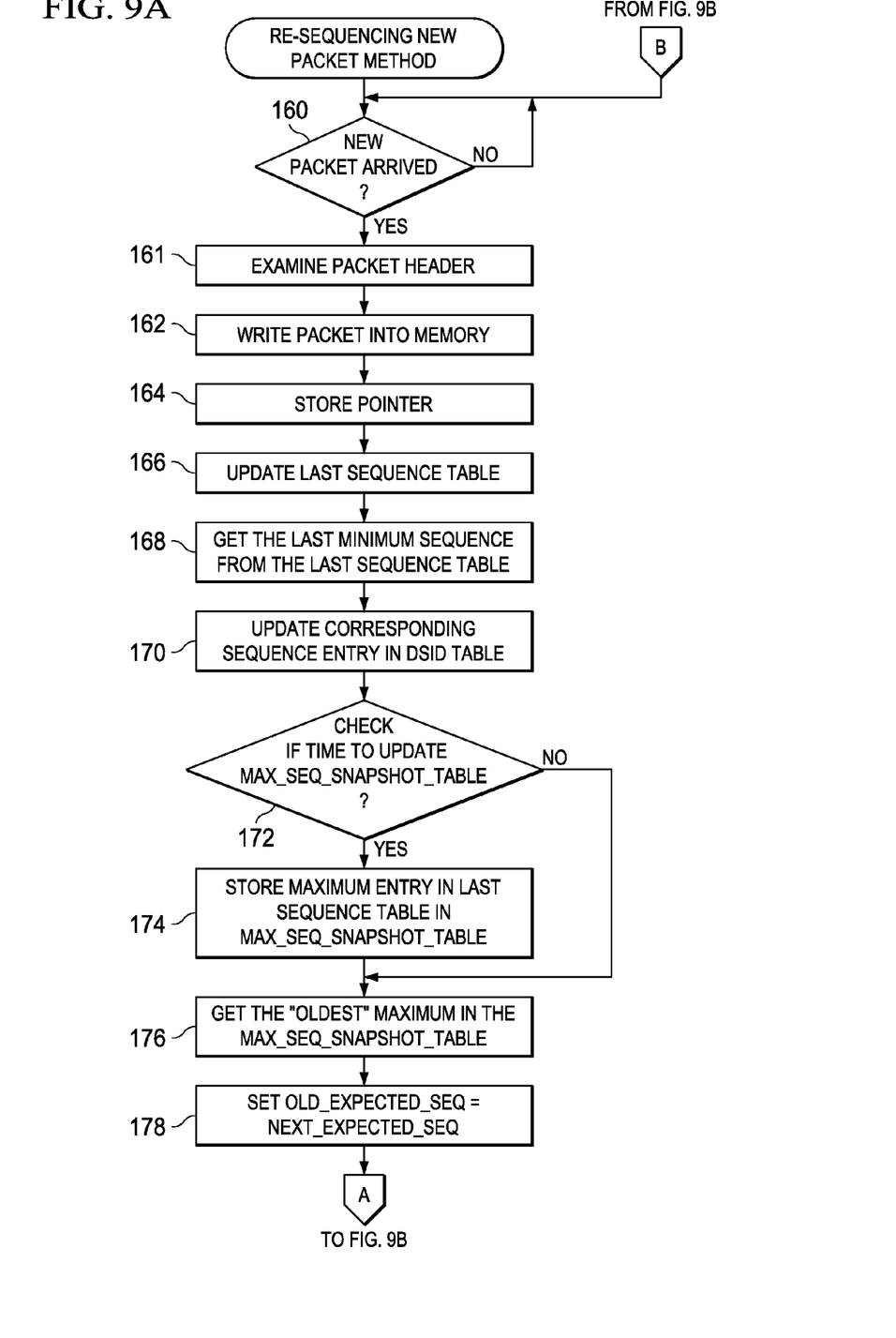
FIGS. 9A and 9B are a flow diagram illustrating the re-sequencing new packet method of the present invention.
Figure 9B:
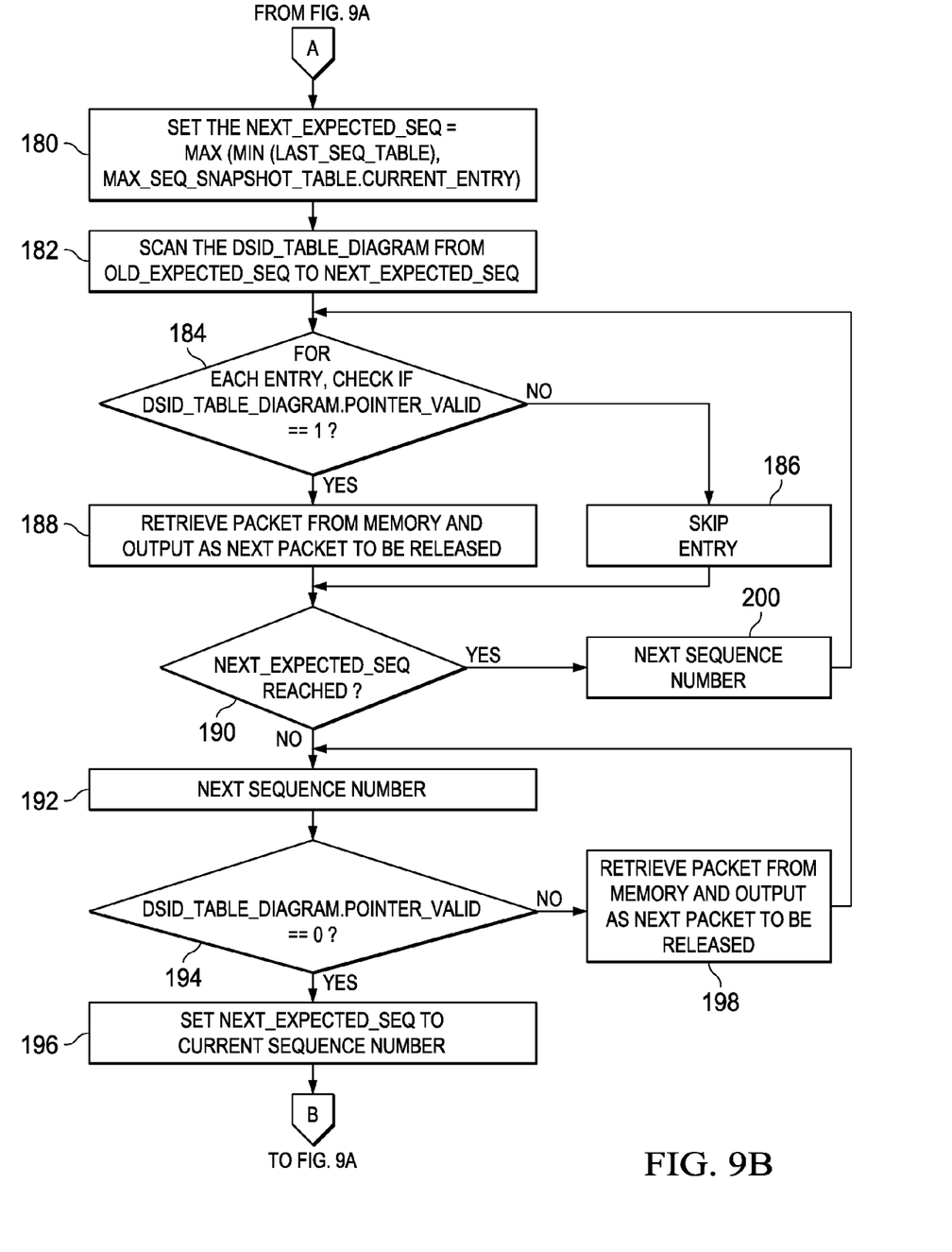

A flow diagram illustrating the re-sequencing new packet method of the present invention is shown in FIGS. 9A and 9B. The packet re-sequencing mechanism of the present invention is, in one embodiment, adapted to be executed by the cable modem processor 24 of FIG. 2 (or packet re-sequencer 86 of FIG. 3). Software or firmware implementing the method resides in one or more storage media devices (e.g., RAM 18, ROM 20, FLASH 22) in communication with the processor. Alternatively, the software implementing the method may reside in internal storage within the processor itself.

Figure 4:
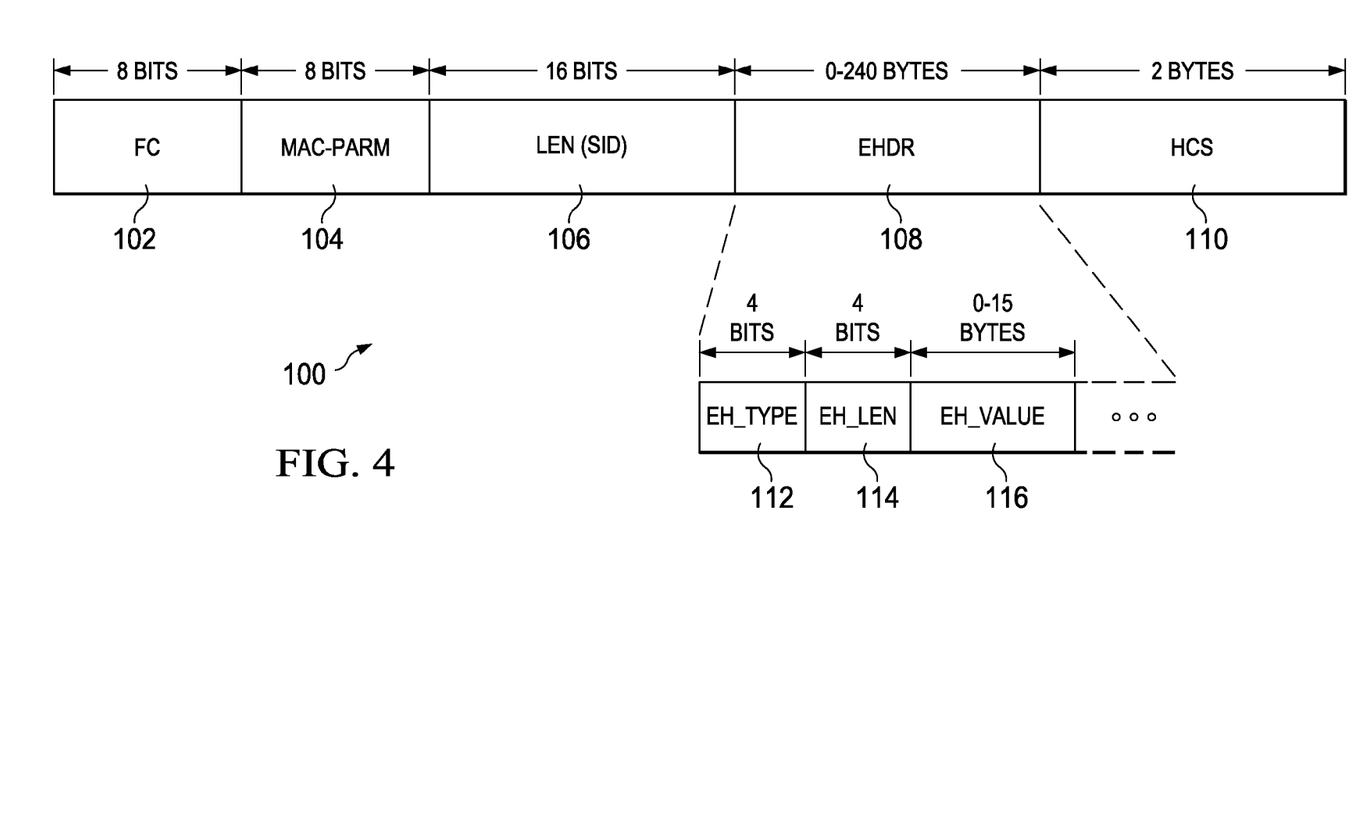
FIG. 4 is a diagram illustrating the packet format of the MAC header.

With reference to FIGS. 3, 9A and 9B, the packet re-sequencer waits for a new packet to arrive (step 160). Upon the arrival of a new packet to the cable modem PHY-MAC, the DOCSIS header and the DOCSIS extended header (if one exists) is analyzed (step 161). A diagram illustrating the packet format of the MAC header is shown in FIG. 4.

The packet format of the MAC header, generally referenced 100, comprises an 8-bit frame control (FC) field 102, an 8-bit parameter (MAC_PARM) field 104 whose use depends on FC, a 16-bit length (LEN) field 106 representing the length of the MAC frame, 0-240 byte extended header (EHDR) field 108 and a 2-byte header check sequence (HCS) 110. The extended header (EHDR) field 108 comprises zero or more TLV fields comprising a 4-bit extended header type (EH_TYPE) field 112, a 4-bit extended header length (EH_LEN) field 114 comprising the length of the EH_VALUE and a 0-15 byte extended header value (EH_VALUE) field 116 comprising the EH element data.

Note that packets transmitted from the CMTS as bonded traffic have a special extended header that includes the 20-bit Downstream Service ID (DSID) and 16-bit packet sequence number. These elements are conveyed in the five-byte DS-EHDR described in Table 6-21 of the DOCSIS 3.0 specification. For clarity sake, the packet re-sequencing mechanism is described for bonded traffic associated with a single DSID (or context) only. It is appreciated, however, that the cable system may employ any number of DSIDs, each DSID referred to as a context throughout this document.

Once the headers of the arriving packets have been examined and the DSID and sequence number extracted, they are stored in a dedicated memory space (step 162). A pointer to the location each packet is stored in is written into a table referred to as the DSID table or context table 92 (step 164). The pointer is written into a location in the context table corresponding to the sequence number of the packet. In addition, a pointer valid bit indicating the status indication of each packet (i.e. received or not received) is stored in the context table as well.

Figure 5:
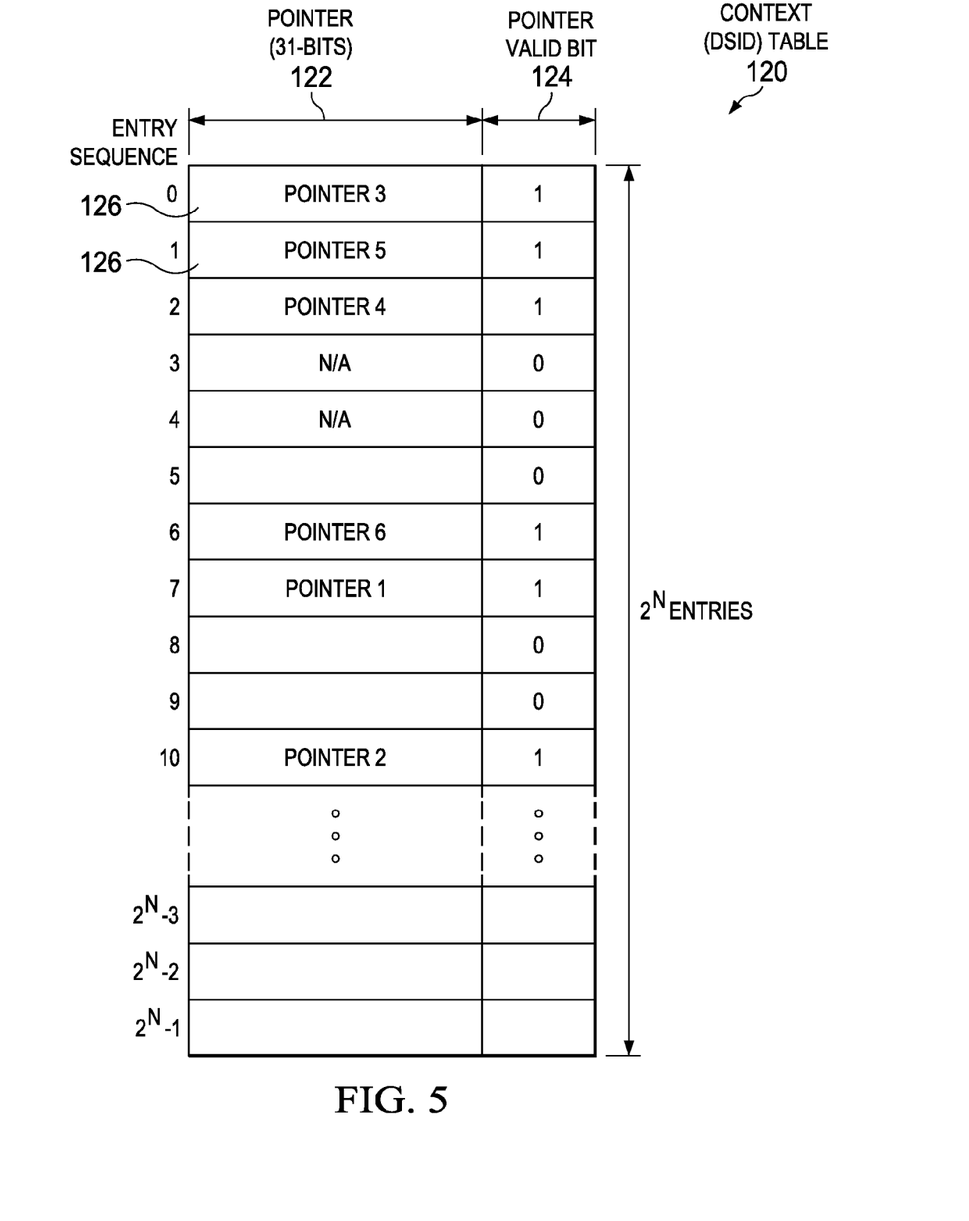
FIG. 5 is a diagram illustrating the structure of the DSID table diagram.

A diagram illustrating the structure of the DSID table diagram is shown in FIG. 5. The context table, generally referenced 120, comprises a plurality of 4-byte entries. Each entry comprises a 31-bit pointer 122 and a 1-bit pointer valid bit 124. The context table comprises $2^N$ entries. One context table is provided per DSID. The invention is able to support any number of context tables. The DOCSIS 3.0 specification requires cable modems to support at least 16 DSIDs. Note that the packets belonging to the various DSIDs may be transmitted over any or all of the downstream PHY channels.

In the example shown in FIG. 5, the first six packets have been received and stored in the context table. Packet 1 was received with sequence number 7, thus it was stored in entry sequence 7 and its corresponding valid pointer bit is set. Similarly, packet 2, having sequence number 10 was received and stored in entry sequence 10. The headers of packets 3 through 6 are similarly examined and stored in the appropriate entry sequence locations in the context table.

Since the packet sequence number is 16-bits, the range of the sequence number is 0 to $2^{16}-1$, the range of the context table is determined by the maximum skew of all bonded channels and the total number of channels. The length of the context table is expressed below as:

$$2^{(\log_2(\text{ceil}(\text{bonding channel skew in packet}*\text{number of channels}))+1)} \quad (1)$$

Therefore, the context table comprises $2^{14}$ entries and the sequence that determines the location of the entry is located in accordance with the 14 LSBs of the sequence number.

At the beginning of the process, the re-sequencer waits for the packet with sequence number 0 to arrive. If it arrives, the next packet expected is 1 and so on. The next expected sequence number is stored in a register called next_expected seq. Packets may arrive on a given set of physical channels denoted by DCID(1), DCID(2), . . . , DCID(n) where n is the number of physical channels associated with a given channel bonding group. The last sequence number received on each channel is stored in a table called the last sequence table 94 (FIG. 3). Upon the arrival of every new packet, the last sequence table is updated (step 166).

Figure 6:
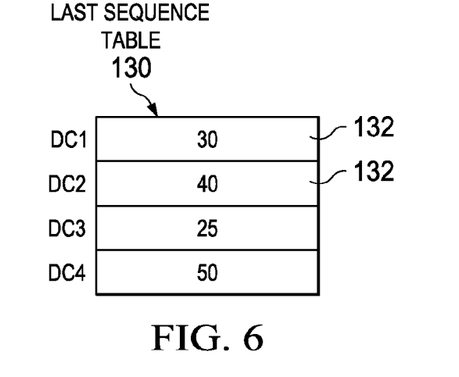
FIG. 6 is a diagram illustrating the structure of the last sequence table.

A diagram illustrating the structure of the last sequence table is shown in FIG. 6. The last sequence table 130, comprises one entry 132 for each downstream channel. The last sequence received over each channel is recorded as each packet is received. In this example, the cable system comprises four bonded downstream channels DC1, DC2, DC3 and DC4. The last sequence number received (i.e. most recent) on channels DC1, DC2, DC3 and DC4 is 30, 40, 25 and 50, respectively. Note that one last sequence table is maintained for each DSID.

In addition, the maximum sequence number that has been received at that point in time (over all bonded downstream channels for a particular DSID) is stored in a table called the max sequence snapshot table 96 (FIG. 3). The maximum sequence number is not stored for each packet received, but rather only at predetermined intervals on a periodic basis. The purpose of this table is to compensate for the maximum permitted skew by releasing packets that would be 'stuck' otherwise since packets subsequent to them have not been received due to them being lost or arriving later than the maximum permitted skew time.

Figure 7:
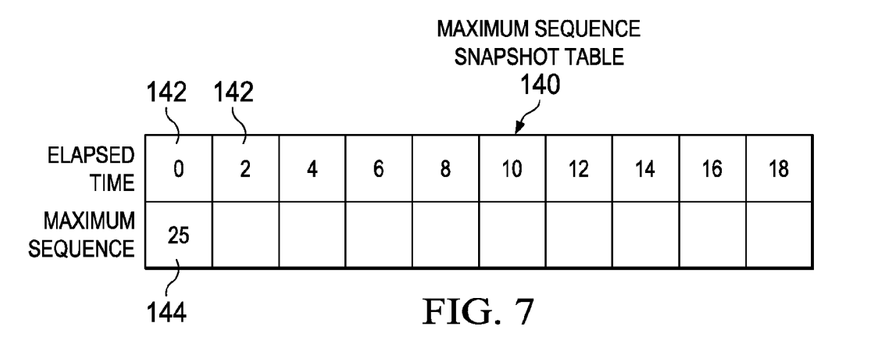
FIG. 7 is a diagram illustrating the structure of the max sequence snapshot table.

A diagram illustrating the structure of the max sequence snapshot table is shown in FIG. 7. The max sequence snapshot table 140, comprises, in this example embodiment, ten entries 142, each holding the largest last sequence number received 144. The max snapshot sequence table comprises a sufficient number of entries to accommodate the maximum anticipated skew time between the channels. In the example embodiment presented herein, the table comprises ten entries. The table is updated every two milliseconds, thus it has the ability to handle the 18 millisecond maximum permitted skew. Thus, every time interval (e.g., two milliseconds), a 'snapshot' of the largest last sequence number received from among the four channels in the last sequence table for that DSID is recorded in the next entry in the max sequence snapshot table.

Once the last sequence table is updated, the last minimum sequence from the last sequence table is retrieved (step 168). This value will be used to determine which packets are to be released from the memory. The corresponding sequence entry in the context table is then updated (step 170). It is then checked if the interval has arrived to update the max sequence snapshot table (step 172). If so, the maximum (largest) entry in the last sequence table is stored in the max sequence snapshot table (step 174).

To release packets from the memory the mechanism first calculates the range of the packets to be released. The is done by first retrieving the 'oldest' maximum in the max sequence snapshot table (step 176). This is the maximum last sequence number stored in the max sequence snapshot table 18 milliseconds previously.

The old_expected_seq is then set to the next_expected_seq variable (step 178). This sets the bottom limit of the range of packets to be released. The new value of next_expected_seq is the larger of (1) the smallest entry currently in the last sequence table and (2) the current (i.e. oldest) entry of the max sequence snapshot table (step 180).

$$\text{next\_expected\_seq} = \max[\min(\text{last\_seq\_table}), \text{max\_seq\_snapshot\_table.current\_entry})] \quad (2)$$

The context table is then scanned from the old_expected_seq to the next_expected_seq (step 182). For each entry in the context table, it is checked whether the pointer valid bit indicates the entry is valid (i.e. DSID_table_diagram.pointer_valid=1) (step 184). If the entry is not valid, the entry is skipped (step 186). If the entry is valid, the packet is retrieved from memory and output as the next packet to be released (step 188). If the next_expected_seq has been reached (step 190), the method increments the sequence number (step 200) and returns to step 184.

If the next_expected_seq has been reached, packets continue to be released until an invalid pointer is encountered (i.e. a missing packet out of sequence). Once a missing packet is encountered, additional packets cannot be released until either the missing packets are received or the skew timeout period is reached.

In particular, the next sequence number is determined (step 192) the pointer valid bit is examined (step 194). If the point valid bit indicates the entry is valid, the packet is retrieved from memory and output as the next packet to be released (step 198). Packets continue to be released until the pointer valid bit indicates a missing packet (i.e. DSID_table_diagram.pointer_valid=0) (step 194). The next_expected_seq is then set to the current sequence number (step 196) and the process continues with step 160.

Note that it is anticipated that the number of lost packets is likely to be very few. Thus, most of the time, the range of packets to be released is determined by the smallest entry in the last sequence table. Considering the example in FIG. 6, packets with sequence numbers up to an including 25 can be released. This is because on any given channel, sequence numbers can only increase. Thus, packet sequence numbers up to and including 25 have been received. Packets with sequence numbers higher than 25 can also be released until a missing packet is encountered, at which point packet release ceases until additional packets are received or the skew time elapses.

Figure 8:
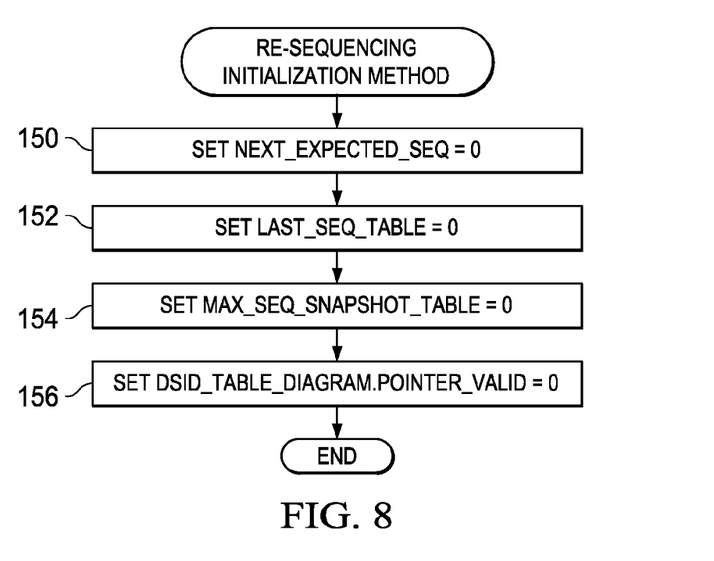
FIG. 8 is a flow diagram illustrating the re-sequencing initialization method of the present invention.

A flow diagram illustrating the re-sequencing initialization method of the present invention is shown in FIG. 8. The initialization method prepares the software data structures (i.e. variables or hardware registers, etc. depending on the implementation) for the incoming packet streams from the downstream channels. In particular, the next_expected_seq variable is set to zero (step 150), the last sequence table is zeroed out (step 152), the max sequence snapshot table is zeroed out as well (step 154) and the DSID table valid pointer bits are all zeroed out as well (step 156).

It is intended that the appended claims cover all such features and advantages of the invention that fall within the spirit and scope of the present invention. As numerous modifications and changes will readily occur to those skilled in the art, it is intended that the invention not be limited to the limited number of embodiments described herein. Accordingly, it will be appreciated that all suitable variations, modifications and equivalents may be resorted to, falling within the spirit and scope of the present invention.

What is claimed is:

1. A method of re-sequencing packets received over a plurality of downstream channels, each received packet having a sequence number associated therewith, said method comprising the steps of:
    updating a last sequence table in accordance with the sequence number associated with a received packet, said last sequence table comprising one entry for each downstream channel;
    storing said received packet in a location in memory;
    storing a pointer to said memory location in a context table at an entry sequence location corresponding to the sequence number of said received packet;
    periodically storing a snapshot of the maximum entry in said last sequence table in a max sequence snapshot table; and
    releasing packets from said memory in sequence number order in accordance with pointers read from said context table up to the larger of the smallest entry in said last sequence table and the oldest entry in said max sequence snapshot table.

2. The method according to claim 1, wherein said plurality of downstream channels comprises Data Over Cable Service Interface Specification (DOCSIS) channels.

3. The method according to claim 1, further comprising the step of continuing to release packets from said memory until a missing sequence entry in said context table is encountered.

4. The method according to claim 1, wherein said max sequence snapshot table is updated periodically with the maximum entry in said last sequence table at that time.

5. The method according to claim 1, wherein said max sequence snapshot table comprises a sufficient number of entries to meet an anticipated maximum skew time.

6. The method according to claim 5, wherein said number of entries comprises ten whereby a maximum last sequence number is stored every two milliseconds to meet a maximum skew between channels of 18 milliseconds.

7. The method according to claim 1, wherein a separate context table, last sequence table and max sequence snapshot table is maintained for each context established over said plurality of downstream channels.

8. A method of re-sequencing packets received over a plurality of downstream channels, each received packet having a sequence number associated therewith, said method comprising the steps of:
    storing received packets in a memory;
    tracking a last sequence number received over each downstream channel;
    periodically recording a snapshot of the maximum last sequence number received over all downstream channels; and
    releasing packets from said memory in sequence order up to the larger of the current minimum last sequence number received and the oldest maximum last sequence number received.

9. The method according to claim 8, wherein said plurality of downstream channels comprises Data Over Cable Service Interface Specification (DOCSIS) channels.

10. The method according to claim 8, further comprising the step of continuing to release packets from said memory until a missing sequence number is encountered.

11. The method according to claim 8, wherein said maximum last sequence numbers are stored in a sequence snapshot table comprising a sufficient number of entries to meet an anticipated maximum skew time.

12. The method according to claim 11, wherein said number of entries comprises ten whereby a maximum last sequence number is stored every two milliseconds to meet a maximum skew between channels of 18 milliseconds.

13. The method according to claim 8, wherein said step of storing comprises storing in a context table a pointer to where a received packet is stored in said memory and a valid indication.

14. The method according to claim 8, wherein said step of tracking comprises storing in a last sequence table a last sequence number for each downstream channel.

15. The method according to claim 8, wherein packets are released only if a valid bit indicates a sequence number is valid.

16. An apparatus for re-sequencing packets received over a plurality of downstream channels, each received packet having a sequence number associated therewith, comprising:
 a memory;
 a context table operative to store pointers to received packets;
 a last sequence table operative to store a plurality of sequence numbers, one for each said downstream channel;
 a max snapshot table operative to store a history of maximum last sequence numbers;
 means for updating said last sequence table in accordance with the sequence number of a received packet;
 means for storing said received packet in a location in said memory;
 means for storing a pointer to said memory location in said context table at an entry sequence location corresponding to the sequence number of said received packet;
 means for periodically updating said max sequence snapshot table with a maximum entry in said last sequence table; and
 means for releasing packets from said memory in sequence number order in accordance with pointers read from said context table, wherein packets are released up to the larger of the smallest entry in said last sequence table and the oldest entry in said max sequence snapshot table.

17. The apparatus according to claim 16, wherein said plurality of channels comprises Data Over Cable Service Interface Specification (DOCSIS) channels.

18. A cable modem, comprising:
 a memory;
 one or more interface ports;
 a tuner coupled to a CATV cable having a plurality of channels, said tuner operative to tune a received broadband signal in accordance with a tune command;
 a PHY circuit coupled to said tuner and operative to generate a baseband signal from the output of said tuner;
 a processor coupled to said memory, said one or more interface ports, said tuner and said PHY circuit, said processor operative to implement a media access control (MAC) layer operative to re-sequence packets received over a plurality of downstream channels, each received packet having a sequence number associated therewith, said MAC layer comprising:
 means for storing received packets in said memory;
 means for tracking a last sequence number received over each downstream channel;
 means for periodically recording the maximum last sequence number received over all downstream channels; and
 means for releasing packets from said memory in sequence order up to the larger of the current minimum last sequence number received and the oldest maximum last sequence number received.

19. The cable modem according to claim 18, wherein said plurality of channels comprises Data Over Cable Service Interface Specification (DOCSIS) channels.

20. The cable modem according to claim 18, wherein said means for releasing further comprises means for continuing to release packets from said memory until a missing sequence number is encountered.

21. The cable modem according to claim 18, wherein said means for periodically recording comprises means for maintaining a history of maximum last sequence numbers sufficient to meet any anticipated skew time between downstream channels.

22. The cable modem according to claim 21, wherein said history comprises ten maximum last sequence number values, wherein a maximum last sequence number is stored every two milliseconds to meet a maximum skew between channels of 18 milliseconds.

23. The cable modem according to claim 18, wherein said means for storing comprises means for storing in a context table a pointer to the storage location within said memory of said received packet and a valid indication.

24. The cable modem according to claim 18, wherein said means for tracking comprises means for storing in a last sequence table a last sequence number for each downstream channel.

25. The cable modem according to claim 18, wherein said means for releasing packets is operative to release a packet only if its corresponding valid bit indicates the associated sequence number is valid.

* * * * *